US009979931B2

(12) United States Patent
Cheng et al.

(10) Patent No.: US 9,979,931 B2
(45) Date of Patent: May 22, 2018

(54) TRANSMITTING A DIGITAL MEDIA STREAM THAT IS ALREADY BEING TRANSMITTED TO A FIRST DEVICE TO A SECOND DEVICE AND INHIBITING PRESENTING TRANSMISSION OF FRAMES INCLUDED WITHIN A SEQUENCE OF FRAMES UNTIL AFTER AN INITIAL FRAME AND FRAMES BETWEEN THE INITIAL FRAME AND A REQUESTED SUBSEQUENT FRAME HAVE BEEN RECEIVED BY THE SECOND DEVICE

(75) Inventors: Stephen Cheng, Foster City, CA (US); David Simmons, Davis, CA (US); Srinivas Manapragada, Fremont, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 2020 days.

(21) Appl. No.: 11/755,611

(22) Filed: May 30, 2007

(65) Prior Publication Data
US 2008/0301315 A1    Dec. 4, 2008

(51) Int. Cl.
*G06F 15/16* (2006.01)
*H04N 7/173* (2011.01)
(Continued)

(52) U.S. Cl.
CPC ..... *H04N 7/17318* (2013.01); *H04N 7/17336* (2013.01); *H04N 21/23406* (2013.01);
(Continued)

(58) Field of Classification Search
CPC ......... H04N 7/17318; H04N 21/23406; H04N 21/23418; H04N 21/47208; H04N 21/47202; H04N 7/17336
(Continued)

(56) References Cited

U.S. PATENT DOCUMENTS 4,949,169 A * 8/1990 Lumelsky et al. ......... 348/14.12
5,014,125 A * 5/1991 Pocock et al. .................. 725/93
(Continued)

OTHER PUBLICATIONS

U.S. Appl. No. 11/747,156, Office Action dated Jun. 12, 2009.
(Continued)

*Primary Examiner* — Daniel C. Murray
(74) *Attorney, Agent, or Firm* — Finch & Maloney PLLC

(57) ABSTRACT

Methods, systems, and apparatus, including medium-encoded computer program products for transmitting digital media streams. In one aspect, a computer-implemented method includes identifying and transmitting a sequence of frames in a digital video transmission, the sequence of frames comprising an initial frame and subsequent frames corresponding to the initial frame, the subsequent frames comprising data that incrementally updates the initial frame, and initiating a new transmission of the sequence of frames to a new device after sending one of the subsequent frames in the digital transmission, the initiating comprising generating information to cause the new device to inhibit presenting the new transmission until after frames between and including the initial frame and the one of the subsequent frames have been received by the new device, and transmitting, to the new device, the information and the frames between and including the initial frame and the one of the subsequent frames.

16 Claims, 3 Drawing Sheets

(51) Int. Cl.
*H04N 21/234* (2011.01)
*H04N 21/472* (2011.01)

(52) U.S. Cl.
CPC . *H04N 21/23418* (2013.01); *H04N 21/47202* (2013.01); *H04N 21/47208* (2013.01)

(58) Field of Classification Search
USPC .......................................................... 709/231
See application file for complete search history.

(56) References Cited

U.S. PATENT DOCUMENTS

| | | | |
|---|---|---|---|
| 5,208,665 A * | 5/1993 | McCalley et al. | 725/119 |
| 5,247,347 A * | 9/1993 | Litteral et al. | 725/114 |
| 5,253,275 A * | 10/1993 | Yurt et al. | 375/240 |
| 5,414,455 A * | 5/1995 | Hooper et al. | 725/88 |
| 5,513,375 A * | 4/1996 | Peters | 710/26 |
| 5,521,630 A * | 5/1996 | Chen et al. | 725/90 |
| 5,533,021 A * | 7/1996 | Branstad et al. | 370/396 |
| 5,537,408 A * | 7/1996 | Branstad et al. | 370/473 |
| 5,553,083 A * | 9/1996 | Miller | 714/748 |
| 5,568,181 A * | 10/1996 | Greenwood et al. | 725/92 |
| 5,583,561 A * | 12/1996 | Baker et al. | 725/93 |
| 5,682,597 A * | 10/1997 | Ganek et al. | 455/3.04 |
| 5,719,786 A * | 2/1998 | Nelson et al. | 709/219 |
| 5,721,815 A * | 2/1998 | Ottesen et al. | 715/721 |
| 5,721,878 A * | 2/1998 | Ottesen et al. | 725/87 |
| 5,768,527 A * | 6/1998 | Zhu et al. | 709/231 |
| 5,768,533 A * | 6/1998 | Ran | 709/247 |
| 6,014,706 A * | 1/2000 | Cannon et al. | 709/231 |
| 6,330,286 B1 * | 12/2001 | Lyons et al. | 375/240.28 |
| 6,373,842 B1 * | 4/2002 | Coverdale et al. | 370/394 |
| 6,543,053 B1 * | 4/2003 | Li et al. | 725/88 |
| 6,684,354 B2 * | 1/2004 | Fukushima et al. | 714/718 |
| 6,711,622 B1 * | 3/2004 | Fuller | H04L 29/06027 709/231 |
| 6,721,794 B2 * | 4/2004 | Taylor et al. | 709/231 |
| 6,728,763 B1 * | 4/2004 | Chen | 709/219 |
| 6,732,183 B1 * | 5/2004 | Graham | H04L 65/4084 348/722 |
| 6,732,313 B2 * | 5/2004 | Fukushima et al. | 714/748 |
| 6,754,715 B1 * | 6/2004 | Cannon et al. | 709/231 |
| 6,766,376 B2 * | 7/2004 | Price | 709/231 |
| 6,782,427 B1 * | 8/2004 | Van Andel et al. | 709/231 |
| 6,792,468 B1 * | 9/2004 | Bloch et al. | 709/231 |
| 6,801,947 B1 * | 10/2004 | Li | 709/231 |
| 6,912,585 B2 * | 6/2005 | Taylor et al. | 709/231 |
| 6,918,077 B2 * | 7/2005 | Fukushima et al. | 714/748 |
| 6,937,657 B2 * | 8/2005 | Wang | 375/240.12 |
| 7,054,949 B2 * | 5/2006 | Jennings | 709/238 |
| 7,069,311 B2 * | 6/2006 | Gupta et al. | 709/219 |
| 7,076,535 B2 * | 7/2006 | Gupta et al. | 709/219 |
| 7,099,953 B2 * | 8/2006 | Horiuchi et al. | 709/231 |
| 7,124,333 B2 * | 10/2006 | Fukushima et al. | 714/701 |
| 7,290,058 B2 * | 10/2007 | Zhu et al. | 709/231 |
| 7,310,680 B1 * | 12/2007 | Graham | H04L 65/4084 370/242 |
| 7,313,808 B1 * | 12/2007 | Gupta et al. | 725/89 |
| 7,325,066 B1 * | 1/2008 | Fuller | H04L 29/06027 370/429 |
| 7,356,245 B2 * | 4/2008 | Belknap et al. | 386/75 |
| 7,356,750 B2 * | 4/2008 | Fukushima et al. | 714/748 |
| 7,359,981 B2 * | 4/2008 | Horiuchi et al. | 709/231 |
| 7,539,393 B2 * | 5/2009 | Dunbar et al. | 386/68 |
| 7,571,246 B2 * | 8/2009 | Virdi et al. | 709/232 |
| 7,698,451 B2 * | 4/2010 | Ganesan | 709/231 |
| 7,733,830 B2 * | 6/2010 | Curcio et al. | 370/333 |
| 7,733,911 B2 * | 6/2010 | Lee | 370/473 |
| 7,734,800 B2 * | 6/2010 | Gupta et al. | 709/231 |
| 7,739,714 B2 * | 6/2010 | Guedalia | 725/90 |
| 7,895,629 B1 * | 2/2011 | Shen et al. | 725/62 |
| 7,930,449 B2 * | 4/2011 | Tinsman et al. | 710/52 |
| 8,095,680 B2 * | 1/2012 | Pettersson et al. | 709/231 |
| 8,132,218 B2 * | 3/2012 | Six | H04N 7/17336 725/119 |
| 8,176,192 B2 * | 5/2012 | Miao et al. | 709/231 |
| 8,190,680 B2 * | 5/2012 | Spilo et al. | 709/204 |
| 8,806,541 B2 * | 8/2014 | Shen et al. | 725/62 |
| 8,973,063 B2 * | 3/2015 | Spilo | H04N 5/76 725/78 |
| 9,055,325 B2 * | 6/2015 | Gaydou | G11B 27/034 |
| 2002/0030966 A1 * | 3/2002 | Huggins | 361/683 |
| 2002/0041629 A1 * | 4/2002 | Hannuksela | 375/240.12 |
| 2002/0129373 A1 * | 9/2002 | Noda et al. | 725/90 |
| 2002/0143988 A1 * | 10/2002 | Jensen | 709/240 |
| 2003/0033417 A1 * | 2/2003 | Zou et al. | 709/230 |
| 2003/0076826 A1 * | 4/2003 | Blasiak et al. | 370/389 |
| 2004/0098671 A1 | 5/2004 | Graham et al. | |
| 2005/0007965 A1 | 1/2005 | Hagen et al. | |
| 2005/0021809 A1 * | 1/2005 | Zhu et al. | 709/231 |
| 2005/0025456 A1 * | 2/2005 | Halfant | 386/68 |
| 2005/0033856 A1 * | 2/2005 | Li | 709/231 |
| 2005/0037740 A1 | 2/2005 | Smith et al. | |
| 2005/0123045 A1 * | 6/2005 | Hannuksela | 375/240.12 |
| 2005/0125838 A1 * | 6/2005 | Wang | H04N 7/17318 725/109 |
| 2005/0183120 A1 * | 8/2005 | Jain et al. | 725/46 |
| 2005/0232290 A1 * | 10/2005 | Mathew et al. | 370/412 |
| 2006/0002681 A1 * | 1/2006 | Spilo et al. | 386/46 |
| 2006/0026294 A1 * | 2/2006 | Virdi et al. | 709/232 |
| 2006/0062216 A1 * | 3/2006 | Li et al. | 370/389 |
| 2006/0104600 A1 * | 5/2006 | Abrams | 386/46 |
| 2006/0242676 A1 | 10/2006 | Hoshino | |
| 2006/0284981 A1 | 12/2006 | Erol et al. | |
| 2007/0005804 A1 | 1/2007 | Rideout | |
| 2007/0101377 A1 * | 5/2007 | Six | H04N 7/17336 725/86 |
| 2007/0232251 A1 | 10/2007 | Murthy et al. | |
| 2007/0285394 A1 * | 12/2007 | Lee et al. | 345/168 |
| 2008/0313682 A1 * | 12/2008 | Kajiura | 725/93 |
| 2009/0055471 A1 * | 2/2009 | Kozat et al. | 709/203 |
| 2009/0089846 A1 * | 4/2009 | Wang | H04N 7/17318 725/98 |
| 2009/0164655 A1 * | 6/2009 | Pettersson et al. | 709/231 |
| 2009/0172179 A1 * | 7/2009 | Miao et al. | 709/231 |
| 2010/0146136 A1 * | 6/2010 | Lou et al. | 709/231 |
| 2011/0138427 A1 * | 6/2011 | Shen et al. | 725/62 |
| 2012/0063743 A1 * | 3/2012 | Bratton et al. | 386/248 |
| 2012/0144435 A1 * | 6/2012 | Spilo et al. | 725/78 |
| 2012/0203891 A1 * | 8/2012 | Jiang et al. | 709/224 |
| 2013/0060906 A1 * | 3/2013 | Gan | 709/219 |
| 2013/0083047 A1 * | 4/2013 | Shamarao et al. | 345/547 |
| 2014/0344410 A1 * | 11/2014 | Saremi et al. | 709/219 |
| 2014/0347989 A1 * | 11/2014 | Shen et al. | 370/230 |

OTHER PUBLICATIONS

U.S. Appl. No. 11/173,985, filed Jun. 30, 2005, entitled "Fast Seek In Streaming Media" by Inventors Srinivas Manapragada, Pritham Shetty, and Asa Whillock.
U.S. Appl. No. 11/173,957, filed Jun. 30, 2005, entitled "Enhanced Seek in Streaming Media" by inventors Srinivas Manapragada, Pritham Shetty, and David Simmons.
http://www.adobe.com/products/aftereffects/pdfs/AdobeStr.pdf, "A Streaming Media Primer", Adobe Dynamic Media Group, 2001.
http://www.adobe.com/products/dvcoll/pdfs/compprimer_0306.pdf, "Compression Primer", Adobe Systems Incorporated, 2006.

* cited by examiner

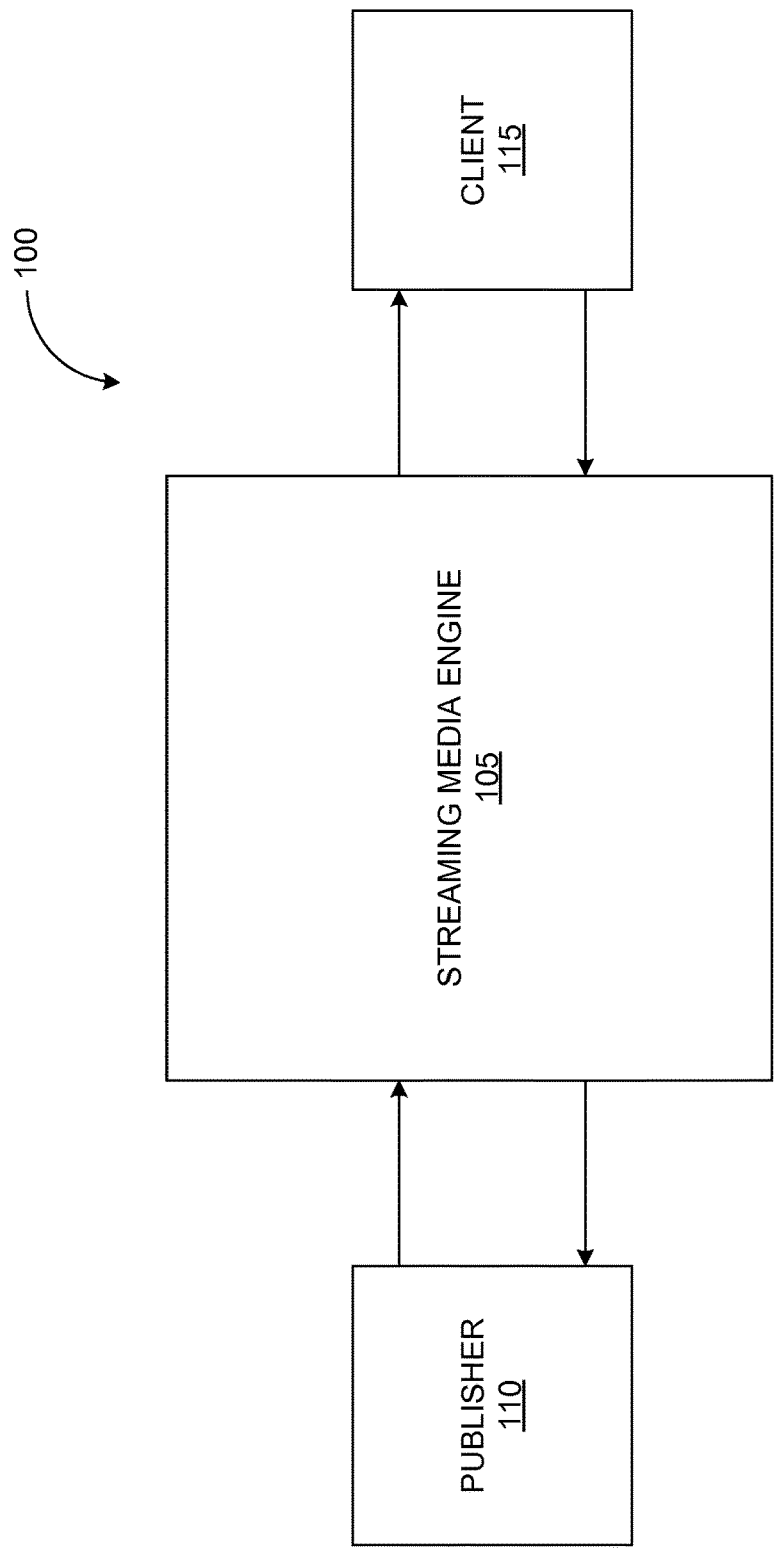

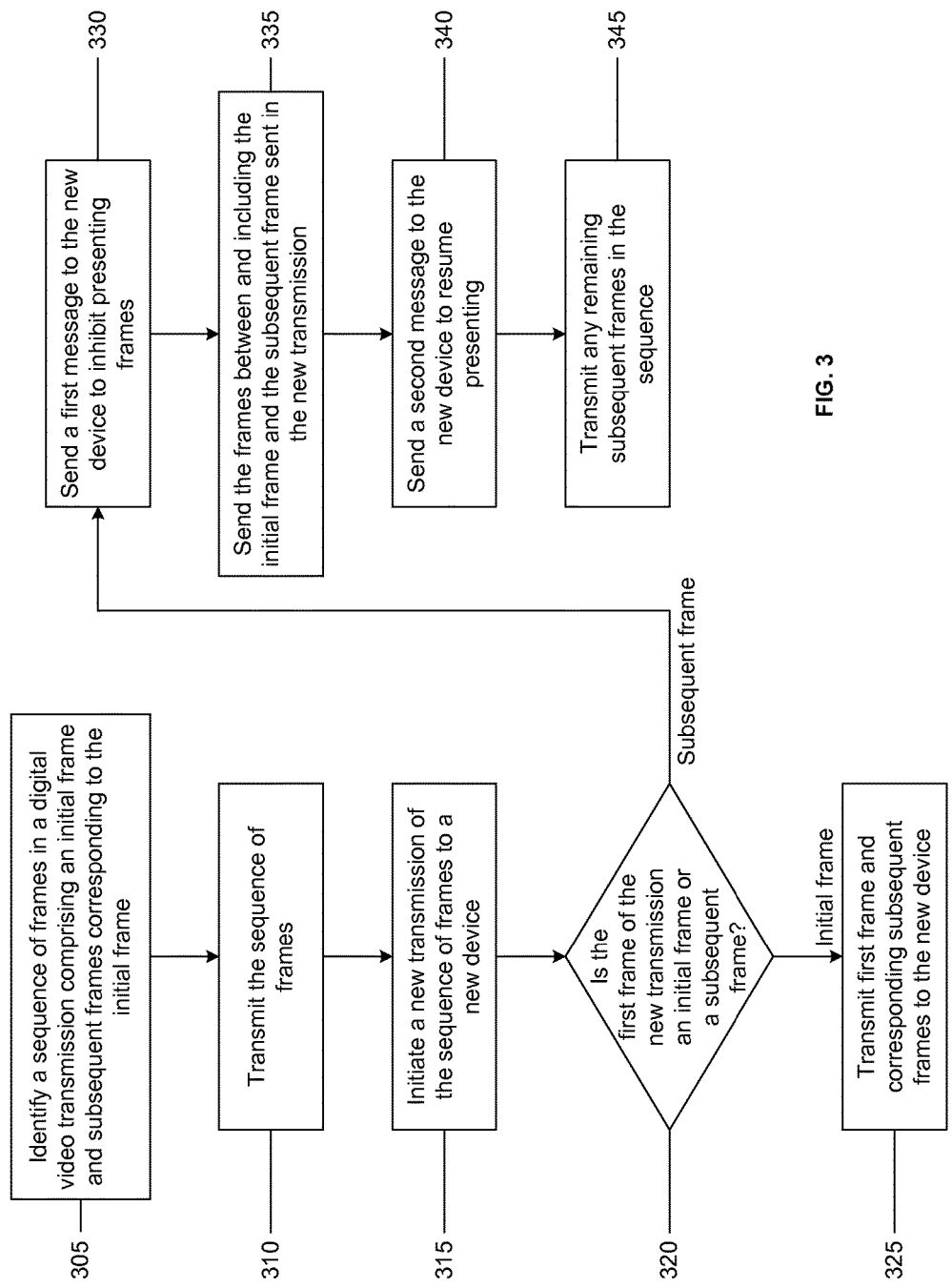

TRANSMITTING A DIGITAL MEDIA
STREAM THAT IS ALREADY BEING
TRANSMITTED TO A FIRST DEVICE TO A
SECOND DEVICE AND INHIBITING
PRESENTING TRANSMISSION OF FRAMES
INCLUDED WITHIN A SEQUENCE OF
FRAMES UNTIL AFTER AN INITIAL FRAME
AND FRAMES BETWEEN THE INITIAL
FRAME AND A REQUESTED SUBSEQUENT
FRAME HAVE BEEN RECEIVED BY THE
SECOND DEVICE

BACKGROUND

This specification relates to streaming digital media.

Streaming digital media enables continuously displaying media content to a user while the content is being delivered by a publisher. The types of digital media that can be streamed include video transmissions, audio transmissions, and the like. A publisher can create a digital video stream by encoding the video footage using video compression software, e.g., codecs such as On2 offered by On2 Technologies (Clifton Park, N.Y., USA), H.263 offered by the International Telecommnunication Union Telecommunication Standardization Sector (ITU-T), screen sharing video and the like. A streaming media server, e.g., Flash Media Server offered by Adobe Systems Incorporated (San Jose, Calif., USA), can transmitted the compressed video stream to a receiving device that can include a media player configured to decompress the video stream and display the video stream on a display device. A video stream can be continuously transmitted, e.g., in a live stream. A user wishing to receive the video stream can join the transmission either when the transmission begins or at any time during the transmission.

SUMMARY

This disclosure describes technologies relating to transmitting digital media streams to devices.

In general, one aspect of the subject matter described in this specification can be embodied in a computer-implemented method including identifying and transmitting a sequence of frames in a digital video transmission, the sequence of frames including an initial frame and subsequent frames corresponding to the initial frame, the subsequent frames including data that incrementally updates the initial frame, and initiating a new transmission of the sequence of frames to a new device after previously sending one of the subsequent frames in the digital transmission, the initiating including generating information to cause the new device to inhibit presenting the new transmission until after frames between and including the initial frame and the one of the subsequent frames have been received by the new device, and transmitting to the new device, the information and the frames between and including the initial frame and the one of the subsequent frames. Other implementations of this aspect include corresponding systems, apparatus, and computer program products.

These and other implementations can optionally include one or more of the following features. Transmitting the information and the frames can include sending a first message to the new device to inhibit presenting, sending the frames between and including the initial frame and the one of the subsequent frames to the new device, and sending a second message to the new device to resume presenting. The method can further include sending the second message to the new device to resume presenting upon receiving a message indicating receipt of the frames between and including the initial frame and the one of the subsequent frames. Identifying and transmitting the sequence can include retrieving the frames from a storage medium and transmitting the frames to clients. Identifying and transmitting the sequence can include receiving the frames from a publisher and transmitting the frames to clients. The method can further include initiating the new transmission in response to a request. The request can be received from the new device.

Particular implementations of the subject matter described in this specification can be implemented to realize one or more of the following advantages. Inhibiting presentation of a video stream that includes key frames and corresponding intermediate frames until all frames in a sequence of frames are received can enhance a user's viewing experience. When a streaming media server transmitting a video stream receives a new request for transmission, the server need not wait to receive a new key frame before commencing transmission in response to the new request. In addition, the client can be presented with the sequence of frames currently being transmitted rather than having to wait until a key frame of a new sequence is available. Further, the server need not generate a new key frame in order to transmit the video stream if the request is received mid-sequence. The operation load on the server, to inhibit presenting the video stream, until all frames in a sequence are available to and have been processed by a client, can be decreased. Such decreased load on the server can result in improved scalability. The server stability can also be increased due to decreased code execution. Several types of codecs can be configured to support inhibiting, thereby improving codec flexibility.

The details of one or more implementations are set forth in the accompanying drawings and the description below. Other features and advantages will be apparent from the description and drawings, and from the claims.

DESCRIPTION OF DRAWINGS

FIG. 1 shows an example system for streaming digital media.

FIG. 3 shows an example process for transmitting a sequence of frames to a client.

Like reference symbols in the various drawings indicate like elements.

DETAILED DESCRIPTION

Figure 2A:
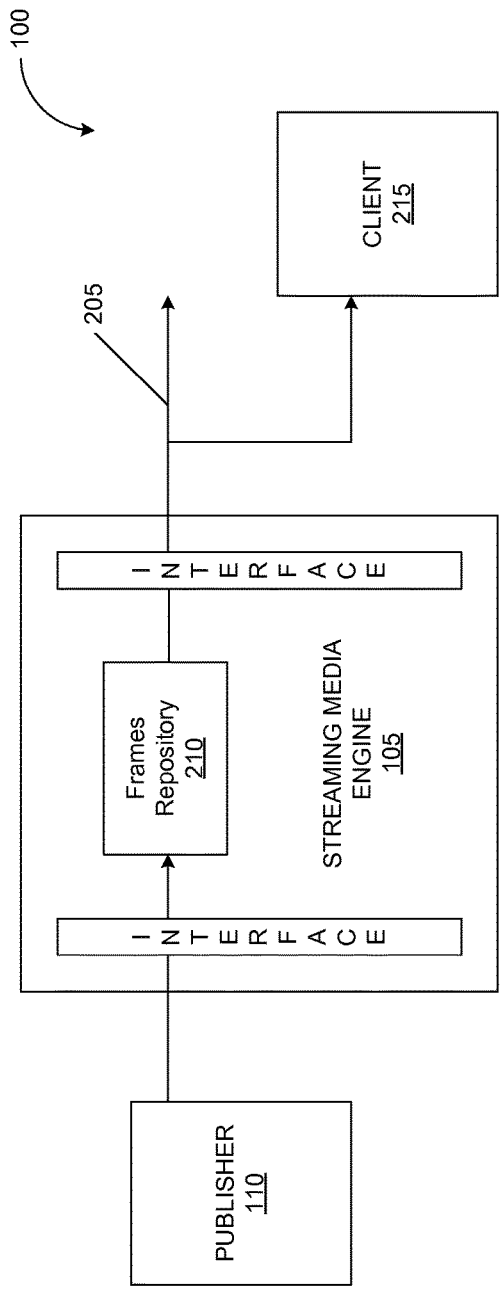
FIG. 2A shows another example system for streaming digital media.

FIG. 1 depicts a schematic of an example system 100 for streaming digital media. The system 100 can include a streaming media engine (SME) 105 configured to receive digital media from a publisher 110 and transmit the received digital media, e.g., to a client 115. The publisher 110 and the client 115 can be operatively coupled to the SME 105 trough wired or wireless channels. In some implementations, the digital media transmission can be a digital video stream, where the video stream is encoded to include two types of frames, namely key frames and intermediate frames. The encoded video stream can include one or more sequences of frames, where each sequence of frames includes a key frame and one or more intermediate frames corresponding to the key frame. A client 115, e.g., a video playback device, can include a decompressor configured to receive the encoded stream and decode the same for playback. In implementations where the video stream is displayed on a display device, the key frame includes information that the decompressor needs to update the screen of the display device and the intermediate frame includes additional information, e.g., incremental updates to the screen for the sequence, that can be applied on top of the corresponding key frame. For example, a sequence of frames can depict two characters enacting a segment against a backdrop common to all frames in the sequence. The key frame can contain information related to the backdrop, while the intermediate frames can contain information related to the movement of the two characters. Thus, while the key frame can affect the display in all frames in the sequence, incremental updates to the sequence can be provided by the intermediate frames corresponding to the key frame. Therefore, a jth intermediate frame in a sequence of frames can be displayed only when the key frame and each preceding intermediate frame in the sequence, until the jth intermediate frame, are available for display. Alternatively, the SME 105 can be any server configured to stream media. The publisher 110 can include any device containing video streams and capable of transmitting the video streams to the SME 105. The client 115 can include any device capable of receiving video streams from the SME 105 and including a streaming media player, e.g., Flash Player.

In some implementations, the SME 105 can broadcast the video stream or transmit the video stream to one or more clients 115. The SME 105 can transmit the video stream to a client 115 starting from the first key frame of the first sequence of frames in the video stream. Alternatively, the SME 105 can initiate a new transmission of the video stream to a new client 115 mid-stream. In some implementations, the SME 105 can initiate the new transmission to the new client 115 in response to a request for the video stream received from the new client 115, after transmission of the video stream to other clients has commenced. Alternatively or in addition, the SME 105 can be configured to initiate the new transmission of the video stream to the new client 115 at a pre-determined time. If transmission to other clients 115 or a broadcast of the video stream has started before the pre-determined time, then the new client 115 may receive the video stream mid-stream.

FIG. 2A is a schematic of an example system 100 for transmitting a video stream to a client 215. In some implementations, the SME 105 can broadcast the video stream, e.g., output a transmission 205, regardless of whether or not the transmission 205 is received by a receiving device, e.g., a client. The SME 105 can receive the video stream from the publisher 110. Alternatively the publisher 110 can transmit the video stream to a third party who can then re-transmit the video stream to the SME 105. In some implementations, the SME 105 can include a frames repository 210 configured to receive and store all the frames in the video stream. In other implementations, the SME 105 can continuously transmit the frames in the video stream as the frames are received, e.g., as in live streaming. The SME 105 can include codecs such as On2 offered by On2 Technologies (Clifton Park, N.Y., USA), H.263 offered by the International Telecommunication Union Telecommunication Standardization Sector (ITU-T), screensharing video, and the like, to compress the video stream received from the publisher 110. Alternatively, the SME 105 can receive the video stream that has been compressed by the publisher 110 or by a third party. The SME 105 can receive the video stream through an interface and can transmit the video stream via another interface. The video stream transmission 205 includes one or more sequences of frames, where the transmission of each sequence starts with the transmission of the key frame of the sequence and is followed by the intermediate frames corresponding to the key frame. In some implementations, the SME 105 can transmit each frame in a sequence at a pre-determined transmission rate. The transmission rate can depend on factors including client 115 capabilities, the bandwidth of the network connection between the SME 105 and the client 115, and the like. The SME 105 can initiate a new transmission of a sequence of frames to a client 215 after commencing transmission 205.

Figure 2B:
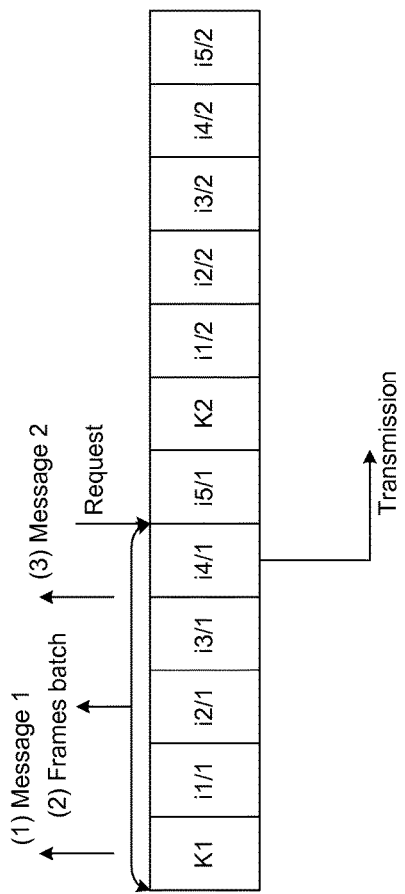
FIG. 2B shows an example of two sequences of frames in a video stream.

FIG. 2B depicts a schematic of an example of two sequences of frames. In some implementations, the SME 105 can initiate a new transmission of a sequence of frames to a client 215 after sending the last intermediate frame of a previous sequence. In such implementations, the new client 215 can first receive the key frame of a sequence. Since the key frame can include all information required to display a screen, the client 215 can process and display the sequence. In other implementations, the SME 105 can initiate a new transmission of a sequence of frames to a client 215 after sending one of the intermediate frames in the transmission 205. For example, as depicted in FIG. 2B, the video stream can include two sequences of frames, where each sequence contains a key frame (K1, K2) and intermediate frames corresponding to each key frame (i1[1]-i5[1] corresponding to K1, and i1[2]-i5[2] corresponding to K2). The SME 105 can initiate a new transmission to a client 215 after transmitting the intermediate frame, i4[1]. The SME 105 can initiate the new transmission in response to a request from the client 215. Thus, the first frame to be displayed by the client 215 can be the intermediate frame, i5[1]. However, the client 215 cannot playback the intermediate frame, i5[1], because the intermediate frame only contains information that incrementally updates the key frame, K1. In order to playback the intermediate frame, i5[1], the client requires all frames in the sequence prior to the i5[1], namely frames K1-i4[1].

In order to enable the client 215 to display the video stream starting from the intermediate frame, i5[1], the SME 105 can transmit the batch of frames in the sequence between and including the key frame, K1, and the intermediate frame, i5[1], namely frames K1, i1[1], i2[1], i3[1], i4[1], and i5[1]. In some implementations, the SME 105 can store a copy of the frames in the video stream during transmission 205 and/or during broadcast. Thus, the SME 105 can retrieve frames K1-i5[1] and transmit the retrieved frames to the client 215. In other implementations, the SME 105 can store all frames in a sequence in a buffer, starting with the key frame, until the last frame of the sequence is transmitted. The SME 105 may then clear the buffer and store the next sequence of frames. Thus, the SME 105 can store frames K1-i5[1] and transmit the stored frames to the client 215. In other implementations, the SME 105 can store all frames of the video stream and retrieve frames K1-i5[1] from the stored frames for transmission to the client 215.

The speed with which the client 215 can process the received batch of frames, K1-i5[1], can depend on factors including processing speed of the client 215, bandwidth of the connection between the SME 105 and the client 215, and the like. For example, once the client 215 receives the batch of frames K1-i5[1], the client 215 can incrementally update the key frame, K1, with the intermediate frames, i1[1]-i4[1], subsequently update the batch with the intermediate frame, i5[1], and display the video steam from the intermediate frame, i5[1]. The immediate processing of the batch of frames, K1-i5[1], can produce undesirable effects on the client 215 side, e.g., a fast forwarding effect.

Prior to transmitting the batch of frames to the client 215, the SME 105 can generate information to cause the client 215 to inhibit presenting the transmission of the video stream until after frames K1-i4[1] have been received and processed by the client 215. For example, the SME 105 can receive a request from a client 215 after the SME 105 has transmitted intermediate frame, i4[1]. The SME 105 can identify that the request from the client 215 has been obtained mid-stream, that the batch of frames K1-i4[1] are to be sent to the client 215, and that the client 215 is to be given time to process the batch of frames K1-i4[1]. The SME 105 can generate information to cause the client 215 to inhibit presenting the new transmission, where the information can include a first message (Message 1) to inhibit presenting and a second message (Message 2) to resume presenting. In some implementations, the SME 105 can send the first message to the client 215 upon initiating the new transmission to the client, then send the batch of frames K1-i4[1] to the client 215, and subsequently send the second message to the client 215 to resume presenting. In other implementations, the SME 105 can concurrently send the batch of frames and instructions to the client 215 to process the batch of frames and refrain from presenting the frames until this processing is completed. The client 215 can process frames K1-i4[1] in the duration between receiving the first and second messages when presentation at the client 215 side is inhibited. In some implementations, the SME 105 can send the second message upon receiving a message from the client 215 that the client 215 has successfully processed the received batch of frames. In other implementations, the SME 105 can be configured to monitor the client 215 until all the frames in the batch sent to the client 215 have been processed and, subsequently, send the second message. By causing the client 215 to inhibit presenting the video stream, the SME 105 can prevent the occurrence of any undesirable effect on the client 215 side when the client 215 simultaneously processes the received batch of frames upon joining the video stream transmission mid-stream.

FIG. 3 depicts a flow chart of an example process for transmitting a sequence of frames to a client. A sequence of frames in a digital video transmission can be identified 305. The sequence of frames can include an initial frame and subsequent frames corresponding to the initial frame. The subsequent frames can include data that incrementally updates the initial frame. The initial frame can be a key frame and the subsequent frames can be intermediate frames corresponding to the key frame. A subsequent frame can be displayed by a receiving device only if all frames between the initial frame and the subsequent frame have been processed by the receiving device. The sequence of frames can be identified as the sequence is received from a source, e.g., a publisher of the frames. For example, the sequence can be part of a live transmission. Alternatively, the sequence of frames can be retrieved from a repository where the sequence is stored. For example, the sequence can be part of a recorded video transmission.

The sequence of frames can be transmitted 310. The sequence of frames can be transmitted to one or more receiving devices, including potentially broadcasting the sequence of frames to any receiving device. A new transmission of the sequence of frames to a new device can be initiated 315. The new device can be a client that includes a video player to play the digital video transmission. In some implementations, the new transmission can be initiated in response to receiving a request from the new device to receive the sequence of frames. In other implementations, the new transmission to the new device can be initiated at a pre-determined time. The first frame of the new transmission can be checked 320. If the first frame is the initial frame of the sequence, then the initial frame and corresponding subsequent frames can be transmitted to the new device 325.

If the first frame is a subsequent frame, then all frames between and including the initial frame and the subsequent frame can be sent to the new device before the new device presents the digital video transmission. In such implementations, initiating the new transmission to the new device can include generating information to cause the new device to inhibit presenting the new transmission until after frames between and including the initial frame and the subsequent frame have been received by the new device. The generated information can include a first message to the new device to inhibit presenting frames and a second message to the new device to resume presenting frames. Transmitting the information to the new device can include sending the first message to inhibit presenting frames 330, sending the frames between and including the initial frame and the subsequent frame sent in the new transmission 335, and sending the second message to the new device to resume presenting 340. Then, any remaining subsequent frames in the sequence can be transmitted 345. In implementations where the subsequent frame is the last frame in the sequence, a transmission of a new sequence of frames can commence after the second message is sent to the new device.

For example, sending the first message can disable display of the stream on the new device. When the second message is sent after all frames between and including the initial frame and the subsequent frame are processed by the new device, the display of the stream can be re-enabled. The batch of frames including all frames between and including the initial frame and the subsequent frame sent in the new transmission can be created by assigning a common time stamp to all frames in the batch, e.g., time stamp 0. The initial frame, e.g., the key frame, can be tagged by a message that has the following message type:

define FAME_TYPE_KEY 0x0 Key frame

A subsequent frame, e.g., an intermediate frame, can be tagged by a message that has the following structure:

define FRAME_TYPE_I 0x20/Intermediate frame

The video stream can include other frames, such as disposable frames (e.g., Sorenson disposable frame) tagged by the following message type:

define FRAME_TYPE_D 0x30//Disposable frame

A new message can be added to represent the new video information message to support streaming. The new message can be represented as follows:

define FRAME_TYPE_INFO 0x50//Frame type info

In some implementations, the new message can be carried in the first byte of a video message. If the video message is type FRAME_TYPE_INFO, then the second byte can have the following messages:

define VIDEO_INFO_SEEK_START 0//Start of client-side seeking video frame sequence and define VIDEO_INFO_SEEK_END 1//End of client-side-seeking video frame sequence

The above messages can represent the first and second messages sent to the new device to cause the inhibiting and resuming of presenting, respectively. In such implementations, any additional data in the message, or other second byte values can be ignored by the new device.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The non-transitory computer readable medium, which does not include a propagated signal, can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs rung on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, in some implementations, the SME 105 can initiate a new transmission to a client 215 after transmitting the intermediate frame, i4[1]. In order to enable the client 215 to display the video stream starting from the intermediate frame, i5[1], the SME 105 can transmit frames K1-i4[1] as a batch of frames to the client 215. The SME 105 can send a first message to the client to inhibit presenting, send the batch of frames, K1-i4[1] to the client, followed by a second message to the client 215 to resume presenting. The client 215 can process the batch of frames, K1-i4[1], in the duration between the receipt of the first and second messages. Subsequently, the SME 105 can send the intermediate frame, i5[1], to the client 215 for display. In this manner, the batch of frames sent to the client for processing need not include the intermediate frame before which the new transmission is initiated.

In other implementations, the batch of frames between and including the initial frame and the subsequent frame sent in the new transmission to the new device can have the same time stamp, e.g., time stamp 0. New frames in the sequence that are sent after the batch of frames is sent can have a different time stamp, e.g., time stamp 1, 2, and the like. The new device can be configured to inhibit presenting while processing all frames with the same time stamp and to resume presenting when a frame with a different time stamp is received. In other implementations, the information causing the new device to inhibit presenting can include a first message to inhibit presenting, a second message that indicates the size of the batch being transmitted to the new device, e.g., a number of frames, a file size (in megabytes), and the like, followed by the batch of frames. The client can determine the time required to process a batch of frames based on the batch size and resume presenting after the determined time expires. In some implementations, the sequence of frames can be related to an audio stream, a data stream, an image stream, and the like. A video stream can include any number of sequences of frames where the number of frames in each sequence may or may not be equal to each other. Accordingly, other implementations are within the scope of the following claims.

What is claimed is:

1. A computer-implemented method comprising:
    identifying, by a server, a sequence of frames in a digital video, the sequence of frames comprising an initial frame and subsequent frames corresponding to the initial frame, the subsequent frames comprising data that incrementally updates the initial frame;
    initiating a first transmission of the sequence of frames from the server to a first device;
    receiving, from a second device, a request for a subsequent frame that forms part of the digital video;
    sending the requested subsequent frame to the second device in response to the request; and
    initiating a second transmission from the server to the second device after sending the requested subsequent frame to the second device, the initiating comprising
        generating a message to cause the second device to inhibit presenting transmission of frames included within the sequence of frames until after the initial frame and frames between the initial frame and the requested subsequent frame have been received by the second device, and
        transmitting, to the second device, the message, the initial frame, and the frames between the initial frame and the requested subsequent frame.

2. The method of claim 1, wherein the initiating further comprises:
    sending a second message to the second device to cause the second device to resume presenting, wherein the second message is sent after the frames between and including the initial frame and the requested subsequent frame are sent to the second device.

3. The method of claim 2, further comprising sending the second message to the second device to resume presenting upon receiving a receipt message indicating receipt of the frames between and including the initial frame and the requested subsequent frame.

4. The method of claim 1, wherein identifying the sequence of frames comprises retrieving the sequence of frames from a storage medium.

5. The method of claim 1, wherein identifying the sequence of frames comprises receiving the sequence of frames from a publisher.

6. A non-transitory computer-readable medium, encoding a program operable to cause a data processing server to perform operations comprising:
    identifying, by the data processing server, a sequence of frames in a digital video, the sequence of frames comprising an initial frame and subsequent frames corresponding to the initial frame, the subsequent frames comprising data that incrementally updates the initial frame;
    initiating a first transmission of the sequence of frames from the data processing server to a first device;
    receiving, from a second device, a request for a subsequent frame that forms part of the digital video, wherein the second device is separate from the data processing server;
    sending the requested subsequent frame to the second device in response to the request; and
    initiating a second transmission from the data processing server to the second device after sending the requested subsequent frame to the second device, the initiating comprising
        generating a message to cause the second device to inhibit presenting transmission of frames included within the sequence of frames until after the initial frame and frames between the initial frame and the requested subsequent frame have been received by the second device, and
        transmitting, to the second device, the message, the initial frame, and the frames between the initial frame and the requested subsequent frame.

7. The computer-readable medium of claim 6, wherein the initiating further comprises:
    sending a second message to the second device to cause the second device to resume presenting, wherein the second message is sent after the frames between and including the initial frame and the requested subsequent frame are sent to the second device.

8. The computer-readable medium of claim 7, the operations further comprising sending the second message to the second device to resume presenting upon receiving a receipt message indicating receipt of the frames between and including the initial frame and the requested subsequent frame.

9. The computer-readable medium of claim 6, wherein identifying the sequence of frames comprises retrieving the sequence of frames from a storage medium.

10. The computer-readable medium of claim 6, wherein identifying the sequence of frames comprises receiving the sequence of frames from a publisher.

11. A system comprising:
a publisher configured to publish a digital video;
a server device including a processor; and
a non-transitory computer-readable medium encoding a streaming media engine configured to perform operations comprising:
identifying, by the server device, a sequence of frames in the digital video, the sequence of frames comprising an initial frame and subsequent frames corresponding to the initial frame, the subsequent frames comprising data that incrementally updates the initial frame;
initiating a first transmission of the sequence of frames from the server device to a first device;
receiving, from a second device, a request for a subsequent frame that forms part of the digital video;
sending the requested subsequent frame to the second device in response to the request; and
initiating a second transmission from the server device to the second device after sending the requested subsequent frame to the second device, wherein the initiating comprises
generating a message to cause the second device to inhibit presenting transmission of frames included within the sequence of frames until after the initial frame and frames between the initial frame and the requested subsequent frame have been received by the second device, and
transmitting, to the second device, the message, the initial frame, and the frames between the initial frame and the requested subsequent frame.

12. The system of claim 11, wherein the initiating further comprises:
sending a second message to the second device to cause the second device to resume presenting, wherein the second message is sent after the frames between and including the initial frame and the requested subsequent frame are sent to the second device.

13. The system of claim 12, the operations further comprising sending the second message to the second device to resume presenting upon receiving a receipt message indicating receipt of the frames between and including the initial frame and the requested subsequent frame.

14. The system of claim 11, wherein identifying the sequence of frames further includes retrieving the sequence of frames from a storage medium.

15. The system of claim 11, wherein identifying the sequence of frames further includes receiving the sequence of frames from the publisher.

16. The system of claim 11, wherein the publisher is integrated with the streaming media engine.

* * * * *